United States Patent
Ahn et al.

(10) Patent No.: US 9,099,883 B2
(45) Date of Patent: Aug. 4, 2015

(54) SYSTEM AND METHOD FOR CONTROLLING CHARGING OF BATTERY OF PORTABLE TERMINAL

(75) Inventors: Eun Woo Ahn, Hwaseong-si (KR); Heui Do Lim, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1299 days.

(21) Appl. No.: 12/589,713

(22) Filed: Oct. 26, 2009

(65) Prior Publication Data

US 2010/0102779 A1 Apr. 29, 2010

(30) Foreign Application Priority Data

Oct. 27, 2008 (KR) .......................... 10-2008-0105448

(51) Int. Cl.
*H02J 7/00* (2006.01)
(52) U.S. Cl.
CPC ............. *H02J 7/0077* (2013.01); *H02J 7/0045* (2013.01); *H02J 7/0085* (2013.01)
(58) Field of Classification Search
USPC ......... 320/107, 111, 114, 132, 134, 159, 160, 320/164; 324/427
See application file for complete search history.

(56) References Cited

U.S. PATENT DOCUMENTS

| | | | |
|---|---|---|---|
| 5,442,274 A | | 8/1995 | Tamai |
| 5,670,863 A | * | 9/1997 | Broell et al. ................... 320/145 |
| 6,137,280 A | * | 10/2000 | Ackermann et al. .......... 323/354 |
| 6,275,006 B1 | | 8/2001 | Koike et al. |
| 2009/0184687 A1 | * | 7/2009 | Schroeder et al. ............. 320/162 |
| 2009/0309547 A1 | * | 12/2009 | Nakatsuji ....................... 320/134 |

FOREIGN PATENT DOCUMENTS

| | | |
|---|---|---|
| JP | 2007-259633 | 10/2007 |
| JP | 2007-288889 | 11/2007 |
| JP | 2007-311107 | 11/2007 |
| KR | 10-2006-0077411 A | 7/2006 |
| KR | 10-2008-0008749 | 1/2008 |

OTHER PUBLICATIONS

Extended European Search Report dated Jan. 8, 2014 in connection with European Patent Application No. 09173949.0, 7 pages.
Notification of Preliminary Rejection dated Aug. 25, 2014 in connection with Korean Patent Applicaiton No. 10-2008-0105448; 19 pages.

* cited by examiner

*Primary Examiner* — Edward Tso
*Assistant Examiner* — Aaron Piggush (57) ABSTRACT

A portable terminal includes a charging control system. The system supplies electric power to the battery. If the battery is charged completely, the system stops charging the battery temporarily, adjusts the termination current, and then charges the battery to the preset second charge capacity. The system can recharge the battery if the battery of the second charge capacity under goes a natural discharge for a certain time period by a certain rate of the second charge capacity, for example, 1%, or if the maximum voltage corresponding to the second charge capacity drops by 1% of the maximum voltage. Therefore, the system can retail the maximum charged state of the battery.

22 Claims, 5 Drawing Sheets

SYSTEM AND METHOD FOR CONTROLLING CHARGING OF BATTERY OF PORTABLE TERMINAL

CROSS-REFERENCE TO RELATED APPLICATION(S) AND CLAIM OF PRIORITY

The present application is related to and claims priority to an application entitled "SYSTEM AND METHOD FOR CONTROLLING CHARGING OF BATTERY OF PORTABLE TERMINAL" filed in the Korean Intellectual Property Office on Oct. 27, 2008 and assigned Serial No. 10-2008-0105448, the contents of which are incorporated herein by reference.

TECHNICAL FIELD OF THE INVENTION

The present invention relates to battery charging technology, and more particularly, to a charging control system and method that can retain the maximum charged state of a battery of a portable terminal.

BACKGROUND OF THE INVENTION

In recent years, technology regarding a battery used in portable terminals has developed rapidly, retaining the electric capacity of a battery at a relatively high level and reducing the size of a battery, so that a variety of optional functions can also be provided to the portable terminals. For example, portable terminals include a file reproduction function that can play back stored audio files and video files. The portable terminals also include various additional functions, such as a camera function for taking a still picture, and a video camera function for tracking and shooting a moving object.

However, although the battery has been developed to greatly increase its electric capacity, the various functions of the portable terminals consume energy from the battery at a higher rate for a shorter period of time.

Meanwhile, a battery mounted in a portable terminal is charged in such a way that the portable terminal is directly connected to an adapter or placed in a holder connected to an adapter. In that case, when the battery is charged to more than a certain ratio of the total charge capacity, the portable terminal recognizes that the battery has been completely charged and then indicates the charged state. Thereafter, the portable terminals disconnect the electric power supply to the battery.

In general, batteries undergo a natural discharge as time elapses. If a battery is not used for a relatively long time period from the time when the battery has been completely charged, the battery does not remain in a fully charged state. Therefore, if a user does not use a battery for a certain period of time after it was completely charged, the user must use the battery that already has been discharged by a certain amount of capacity.

SUMMARY OF THE INVENTION

To address the above-discussed deficiencies of the prior art, it is a primary object to provide a system and method that can detect a charged capacity of a battery in a portable terminal and retain a maximum charged state of the battery.

In accordance with an exemplary embodiment of the present invention, the present invention provides a method for controlling a charging of a battery in a portable terminal whose connecting unit is connected to a power charger adapter. The method includes charging the battery to a first charge capacity; stopping the charging of the battery for a first time period and adjusting a termination current; and charging the battery to a second charge capacity until the charging current equals the adjusted termination current.

In accordance with another exemplary embodiment of the present invention, the method further includes: if the battery has been charged to the second charge capacity and then discharged to a capacity equal to or less than a certain ratio of the second charged capacity, recharging the battery to the second charge capacity; or if the battery has been charged to the second charge capacity and then undergoes a natural discharge for a certain time period, recharging the battery to the second charge capacity. The method may also include, if the voltage of the battery that has been charged to the second charge capacity drops by a certain value in a state where the power charger adapter is connected to the connecting unit, recharging the battery to the second charge capacity.

In accordance with another exemplary embodiment of the present invention, the present invention provides a system for controlling a charging of a battery in a portable terminal. The system includes a connecting unit adapted to connect to a power charger adapter; a battery adapted to be charged by an electric power that is supplied from the power charger adapter via the connecting unit; a power supply configured to check and adjust the electric power supplied to the battery; and a controller configured to: control the power supply to charge the battery until the battery is charged to a first charge capacity; break electric power for a first time period; adjust termination current of the battery; and charge the battery until the battery is charged to a second charge capacity.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged battery charging system.

Detailed descriptions of well-known functions and structures incorporated herein may be omitted to avoid obscuring the subject matter of the present invention.

Although the drawings represent an embodiment of the invention, the drawings are not necessarily to scale and certain features may be exaggerated or omitted in order to better illustrate and explain the present invention. The same reference numbers are used throughout the drawings to refer to the same or similar parts.

Prior to explaining the embodiments of the present invention, terminologies will be defined for the present description below:

In the following description, the term 'complete charge' refers to a charged battery state wherein a battery is charged in a first charged capacity. For example, the complete charge can be 95% of the total charge capacity.

In addition, the term 'full charge' refers to a charged battery state where a battery is fully charged in a second charged capacity. For example, a full charge state can be 99% of the total battery capacity. That is, full charging is performed after complete charging by additional power supply.

Figure 1:
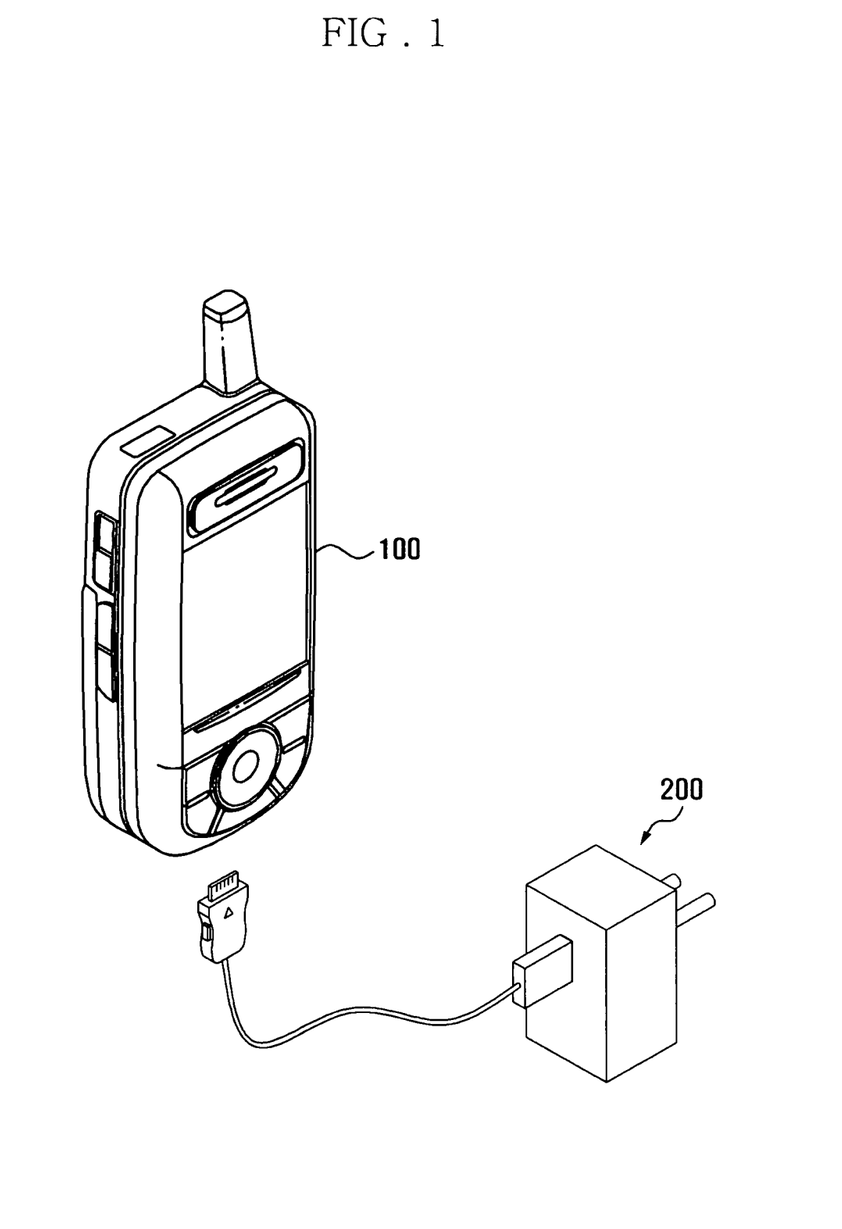
FIG. 1 illustrates a view of a charging system for a portable terminal according to an embodiment of the present invention.

FIG. 1 illustrates a view of a charging system for a portable terminal, according to an embodiment of the present invention.

Referring to FIG. 1, the charging system includes a portable terminal 100 that includes a battery, and a power charger adapter 200. The power adapter 200 is connected to electrical receptacles and is adapted to convert commercial power to a corresponding power and supply the converted power to the portable terminal 100.

The portable terminal 100 is configured to store the battery therein. The battery is connected to a connecting part formed at one side of the portable terminal 100. The connecting part further is connected to the power charger adapter 200. The power charger adapter 200 supplies electric power to the battery via the connecting part, so that the battery can be charged. In the process of charging the battery, when the battery has been charged in a first charge capacity, i.e., 95% of the total battery capacity, the portable terminal 100 indicates an alarm regarding a completely charged state. After a certain period of time has elapsed from that time point, the portable terminal 100 performs a control operation in order to allow the battery to be charged until it reaches the second charge capacity.

Thereafter, while the portable terminal 100 remains connected to the power charger adapter 200 and while the portable terminal 100 ascertains that the battery has been charged until the second charge capacity, the portable terminal 100 discontinues charging the battery. Then, the portable terminal 100 waits for a specified period of time until the battery undergoes a natural discharge. If the battery discharges to a third charge capacity, the portable terminal 100 performs a control operation so that the battery can be recharged to the second charge capacity. As such, the charging system according to the present invention can retain a maximum charged state of the battery, thereby efficiently using electric power to charge the battery.

The power charger adapter 200 includes a connector adapted to join a connecting part of the portable terminal 100, a power converting part, and a cable operable to connect the connector to the power converting part. The power converting part is configured in such a way that its pins are fitted into the electrical receptacles. The power converting part converts a voltage, for example, 220 V or 110 V, into a reduced voltage, for example, 4.2 V, in order to charge the battery of the portable terminal 100. The power charger adapter 200 charges the battery using a current of a few hundred of milliampere, for example, 400 mA, in a constant current section, and using a current that is less than the current in a constant voltage section.

The portable terminal 100 includes a connecting part that serves as a connection for the power charger adapter 200. The portable terminal 100 receives electric power from the power charger adapter 200 via the connecting part and charges the battery. The portable terminal 100 can detect a present remaining battery capacity of the battery based on charging current from the power charger adapter 200.

More specifically, the power charger adapter 200 varies the charging current according to the charged battery capacity. That is, if a power supply of the portable terminal 100, corresponding to a Power Management Unit (PMU), sets a termination current, for example, 100 mA, corresponding to 95% of the total battery capacity, and the charging current of the power charger adapter 200 is varied to 100 mA, the portable terminal 100 can identify a completely charged state using the variation of the charging current. Similarly, if the power supply of the portable terminal 100 sets a termination current, for example, 30 mA, corresponding to 99% of the total battery capacity, and the charging current of the power charger adapter 200 is varied to 30 mA, the portable terminal 100 can identify that the battery is charged to 99% of the total battery capacity. Thereafter, if the battery undergoes a natural discharge such that its remaining battery capacity is equal to or less than a specified capacity or its potential drops from the maximum voltage by 0.04 V, the portable terminal 100 can recharge the battery. The portable terminal 100 estimates a time period required for the battery to be discharged by a natural discharge. Then, the portable terminal 100 waits for a corresponding time period, so that it can detect a reduction rate of the battery capacity by a natural discharge. The portable terminal 100 can also track a certain rate of battery capacity reduction through the variation of a voltage drop amount. The portable terminal 100 additionally stores information regarding the maximum voltage value in a state where the battery is charged to 99% of the total battery capacity and then tracks the variation of a voltage drop amount with respect to the stored information.

In the following description, the configuration and functions of the portable terminal 100 are explained in detail with reference to FIG. 2.

Figure 2:
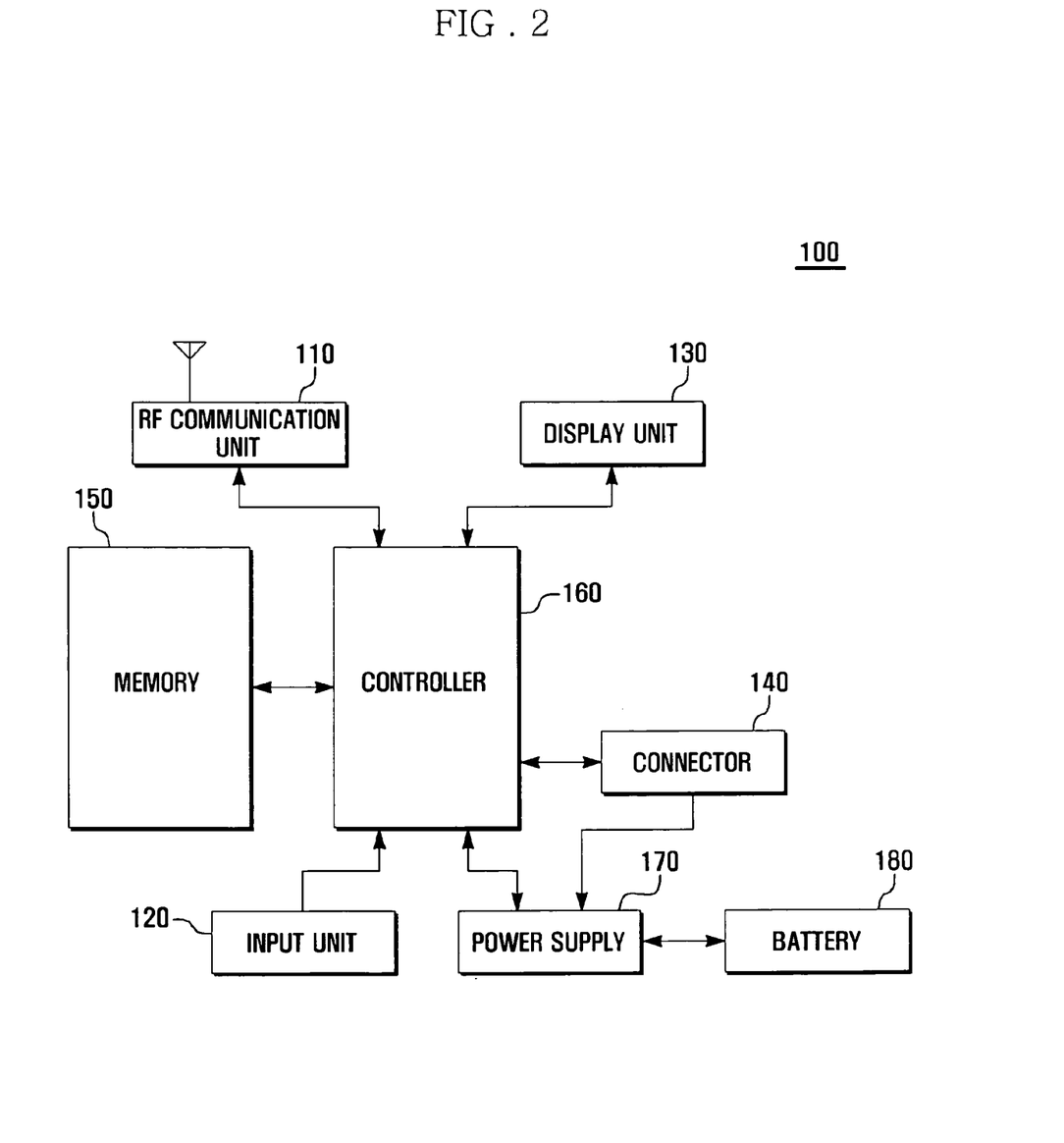
FIG. 2 illustrates a schematic block diagram of a portable terminal according to an embodiment of the present invention.

FIG. 2 illustrates a schematic block diagram of a portable terminal 100 according to an embodiment of the present invention.

Referring to FIG. 2, the portable terminal 100 includes an RF communication unit 110, an input unit 120, a display unit 130, a connecting unit 140, a memory 150, a controller 160, a power supply 170 and a battery 180.

The RF communication unit 110 may be included in the portable terminal 100 if the portable terminal 100 is implemented as a mobile communication terminal. In such case, the RF communication unit 110 can provide mobile communication related services. For example, the RF communication unit 110 transmits and receives a voice call or video and data call to and from a network, according to the control of the controller 160. To this end, the RF communication unit 110 includes an RF transmitter for up-converting the frequency of transmitted signals and amplifying the transmitted signals. Additionally, the RF communication unit 110 includes an RF transmitter includes an RF receiver for low-noise amplifying received RF signals and down-converting the frequency of the received RF signals. The RF communication unit 110 receives electric power from the battery 180 connected to the power supply 170, according to the control of the controller 160. In embodiments wherein the connecting unit 140 is connected to the power charger adapter 200, the RF communication unit 110 can receive electric power from the battery 180 and the power charger adapter 200.

The input unit 120 includes a plurality of input keys and function keys to input number or letter information and to set a variety of functions. The function keys include direction keys, side keys, and shortcut keys, and the like, which are set to perform specific functions. The input unit 120 generates key signals related to a user's setting and function controls of the portable terminal, and outputs them to the controller 160. In particular, the input unit 120 can generate an incoming or outgoing call input signal for activating the RF communication unit 110, and output it to the controller 160.

The memory 150 stores application programs for reproducing a variety of files and for controlling electric power. The memory 150 also stores user data. The memory 150 may also store an application program for operating the RF communication unit 110, if the portable terminal 100 is implemented with a mobile communication terminal. The memory 150 can temporarily store information regarding current remaining battery capacity of the battery 180. The memory 150 is configured to include a program area and a data area.

The program area stores an Operating System (OS) for booting the portable terminal 100, and application programs necessary for other optional functions, such as an audio sound reproduction function, an image or moving image reproduction function, and the like. In particular, the program area also stores an electric power control application program that can check a charged state of a battery 180 to indicate a completely charged state or additionally supply electric power to the completely charged battery 180 to provide a fully charged state. Such an electric power controlling method will be explained in detail, later, with reference to FIG. 3. The respective functions can be activated by a corresponding application program, under the control of the controller 160, according to a user's request or a battery state.

The data area stores data generated as the portable terminal 100 is used. Examples of the data are user data, related to the previously described optional functions, for example, moving images, phone book data, audio data, and corresponding contents. Another example of the data is a variety of information regarding user data. In particular, the data area stores reference values for operating the power supply 170 as an electric power control application program. That is, the data area stores reference information corresponding to a reference value for a completely charged condition to charge under which the battery 180 is charged to 95% of the total battery capacity. For example, the reference information is used to determine that the battery 180 has been charged to a completely charged state if current of 100 mA is supplied from the connecting unit 140 to the power supply 170. The data area stores reference information corresponding to a reference value for a fully charged condition to charge under which the battery 180 is charged to 99% of the total battery capacity. For example, the reference information is used to determine that the battery 180 has been charged to a completely charged state if current of 30 mA is supplied from the connecting unit 140 to the power supply 170. The data area stores information regarding a voltage value when the battery 180 has been fully charged. The data area stores information regarding a time period during which a fully charged battery 180 undergoes a natural discharge or is used for operation until its remaining battery capacity is decreased to 98% of the total battery capacity. The data area stores information regarding a voltage drop value, for example, 0.04 V, from the maximum voltage value corresponding to a fully charged state. The time period, during which the fully charged battery discharges 1% from its fully charged capacity by a natural discharge, can be calculated in such a way that 1% of the charged amount is divided by the average consumption current of the portable terminal 100. The controller 160 of the respective portable terminal 100 can calculate this discharging time period. That is, the controller 160 of the portable terminal 100 can calculate a discharging time period of a battery 180, using information regarding current consumption by portable terminal 100, when the battery 180 is installed in the portable terminal 100, where the information is input into the portable terminal 100 when the portable terminal is manufactured. The information serves to retain the battery 180 in a fully charged state or in a third charging state, i.e., 98% of the total battery capacity. Also, this information, serving as a reference value, is compared with information obtained when the power supply 170 checks charging current supplied to the battery 180 via the connecting unit 140.

Although the embodiment of the portable terminal 100 according to the present invention is configured in such a way that the memory 150 stores the information output from the power supply 170, it should be understood that the present invention is not limited to this embodiment. For example, the embodiment can be modified in such a way that the controller 160 of the portable terminal 100 further includes a buffer and stores information related to the control of the power supply 170 in the buffer. In such example, the portable terminal 100 is operated in such away that the controller 160 uses an application program for a power control algorithm, stored in the program area, and information related to the power supply 170, stored in the data area, and performs the determination regarding a battery charge state.

If the charging current that is supplied to the battery 180 via the connecting unit 140, according to the set termination current, is 100 mA, the controller 160 identifies that the battery 180 is completely charged, e.g., the battery 180 is charged to 95% of the total battery capacity. Similarly, if the charging current is 30 mA, the controller 160 identifies that the battery 180 is fully charged, e.g., the battery 180 is charged to 99% of the total battery capacity. Additionally, if a preset time period has elapsed in a fully charged state of the battery 180 where electric power is not supplied to the battery 180 in the portable terminal 100 or a voltage has dropped by a preset value, the controller 160 identifies that the battery charge is at 98% of the total battery capacity.

The battery 180 can be manufactured in such way as to be detachably mounted to the portable terminal 100. It is preferable that the battery 180 is a rechargeable battery, considering reuse, economical efficiency, and so forth. The battery 180 is placed and mounted in a space formed inside the portable terminal 100. The battery 180 includes an external case for protecting its outer appearance.

Figure 3:
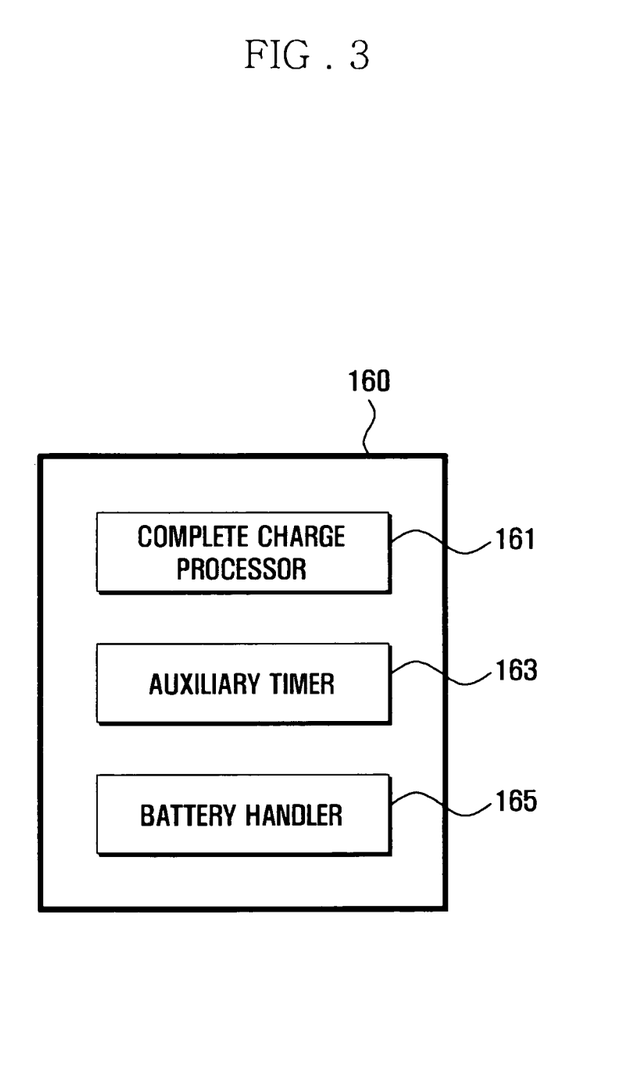
FIG. 3 illustrates a schematic block diagram of a controller shown in FIG. 2.

The controller 160 generates control signals for controlling elements in the portable terminal 100 and controls signals flowing among them. If the portable terminal 100 serves to support mobile communication function and file reproduction function, the controller 160 includes a modem and codec function for processing transmitted or received signals and files. In particular, in an embodiment of the present invention, the controller 160 controls the power supply 170, based on information output from the power supply 170, i.e., information regarding the charged capacity of the battery 180, in order to charge and discharge the battery 180. Accordingly, as shown in FIG. 3, the controller 160 includes a complete charge processor 161, an auxiliary timer 163, and a battery handler 165.

If the battery 180 is charged to 95% of the total battery capacity according to a signal from the power supply 170, the complete charge processor 161 detects that the battery 180 is completely charged and provides a signal to the user. If the battery 180 is completely charged, the complete charge processor 161 can change the color of a lamp installed in the display unit 130 of the portable terminal 100 or installed in the connector of the power charger adapter 200.

When the battery 180 is completely charged, the complete charge is alarmed and electric power is no longer supplied to the battery 180 from the connector. In such example, the auxiliary timer 163 counts a preparation time period $T_S$ that is required to fully charge the battery 180 or a discharge time period $T_L$ that is required until 99% of the total battery capacity is discharged by 1%. That is, the auxiliary timer 163 counts the initial time period $T_S$ in order to adjust the termination current in a completely charged state of the battery 180 and a discharge time period $T_L$ in order to detect a natural discharge of 1% from the battery 180 in a fully charged state. The initial time period $T_S$ and the charge time period $T_L$ serve as the reference time period for controlling battery charge.

The battery handler 165 acquires a voltage drop value of the battery 180 from the maximum voltage that corresponds to a fully charged state, i.e., 99% of the total battery capacity, and a certain voltage that corresponds to a state where the battery 180 is discharged by 1% from a fully charged state. That is, the battery handler 165 acquires the voltage drop value in such a way that 1% of charged battery capacity is divided by the total battery capacity, i.e., the maximum voltage value is divided by 100. For example, if the maximum voltage value is 4.2 V, the voltage drop value is approximately 0.04 V.

As described above, the charging control system for a portable terminal 100 indicates a completely charged battery and simultaneously prepares for a fully charged state of the battery 180. If the battery 180 is in a fully charged state, the system performs a control operation to retain the fully charged state of the battery 180 within an error of 1%. Therefore, the charging control system for a portable terminal can continue to maintain the maximum charged state of the battery and, thus, improve the use efficiency of the battery.

The portable terminal 100 can further include an audio processing unit for indicating the completely charged state of the battery. The audio processing unit can output a preset signal corresponding to the completely charged state of the battery under the control of the controller 160. The audio processing unit can also serve to output or receive audio signals if the portable terminal operates a voice call or a file reproduction, and the like.

Figure 4:
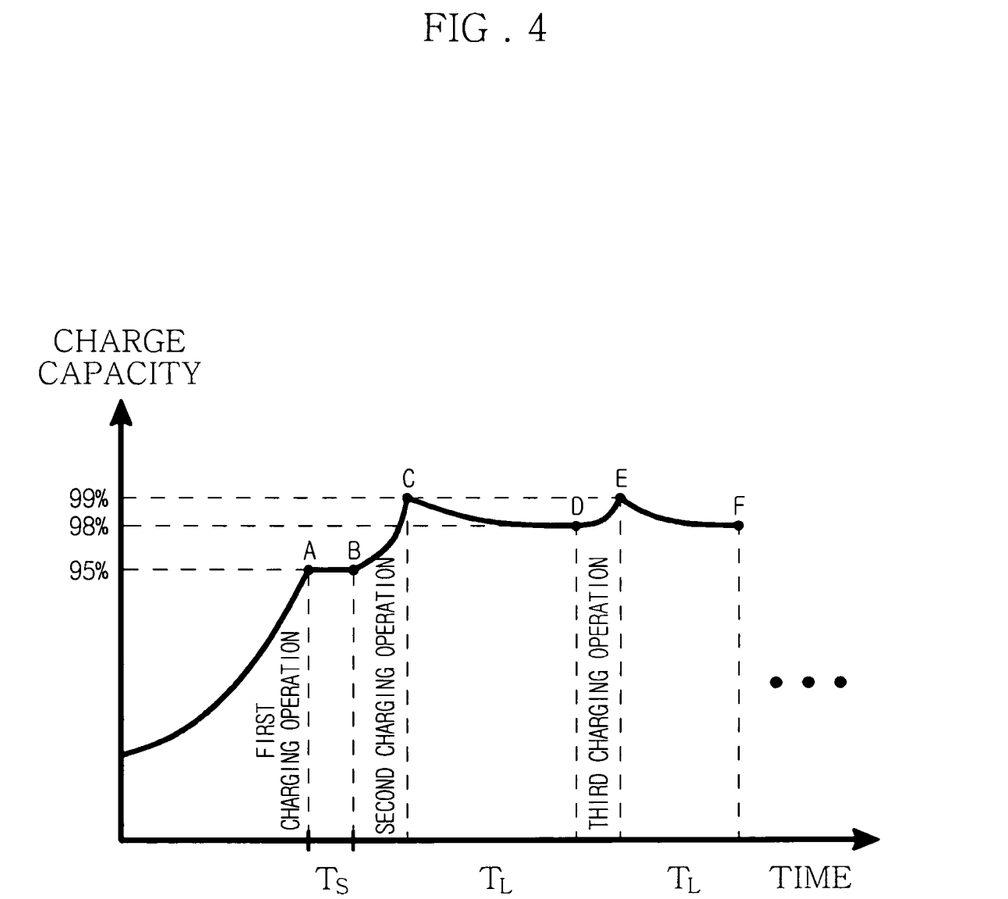
FIG. 4 illustrates a graph describing a process for controlling electric power according to an embodiment of the present invention.

FIG. 4 illustrates a graph describing a process for controlling battery charge according to an embodiment of the present invention.

Referring to FIG. 4, if the battery of the portable terminal discharges and has a remaining battery capacity of less than 95% of its total battery capacity, it is charged by electric power of 4.2 V, 400 mA in the first charge section. This charging process is performed for a specified period of time. When the charged battery capacity is 95% of the total battery capacity, i.e., the charging current output from the power charger adapter 200 is 100 mA, the power supply identifies that the charged battery capacity is 95% of the total battery capacity, which is point 'A' on the graph. In such case, the power supply interrupts the electric power, supplied via the connecting unit 140, for a time period '$T_S$' (points between 'A' and 'B' on the graph). The power supply changes the termination current of the battery for the time period '$T_S$'. This allows the battery 180 to be in the second charge section. If the charged battery capacity is 99% of the total battery capacity, i.e., the charging current is 30 mA, the power supply identifies that the charged battery capacity is 99% of the total battery capacity, which is point 'C' in the graph and thus ceases charging the battery 180.

After that, the controller 160 controls the auxiliary timer 163 to count a time period $T_L$. The time period $T_L$ refers to a period of time required for the battery 180 to discharge 1% from 99% of its total battery capacity. This time period $T_L$ can be acquired in such a way that 1% of the charged battery capacity is divided by the average current consumption of a portable terminal 100. The average current consumption of a portable terminal 100 can be acquired by subtracting the current input to a battery 180 from the current input to the power charger adapter.

After the time period $T_L$ has elapsed, the charged battery capacity reaches to point 'D' on the graph, the power supply identifies that the charged battery capacity is 98% of the total battery capacity and then recharges the battery for the third charge section. During the recharging operation, if the charged battery capacity reaches 99% of the total, point 'D', corresponding to a preset charging current variation from 100 mA to 30 mA, the power supply can complete the battery charge.

While a time period $T_L$ is elapsing, if the portable terminal operates a particular function, for example, a voice call function or a file reproduction function, the controller 160 enables the battery handler 165 to detect whether a voltage drop is less than a preset value, for example, 0.04 V. To this end, the controller 160 stores the maximum voltage value in a fully charged state and detects whether a preset voltage drop occurs.

Next, the power supply stops charging the battery and allows the battery to undergo a natural discharge. The auxiliary timer 163 is activated to count a time period $T_L$. After that, the processes described above are repeated. These charging and discharging processes continue while the power charger adapter is connected to the portable terminal. If the power charge adapter is removed from the connecting unit 140 of the portable terminal 100, the power supply may only perform an electric power supplying process using the battery 180.

Figure 5:
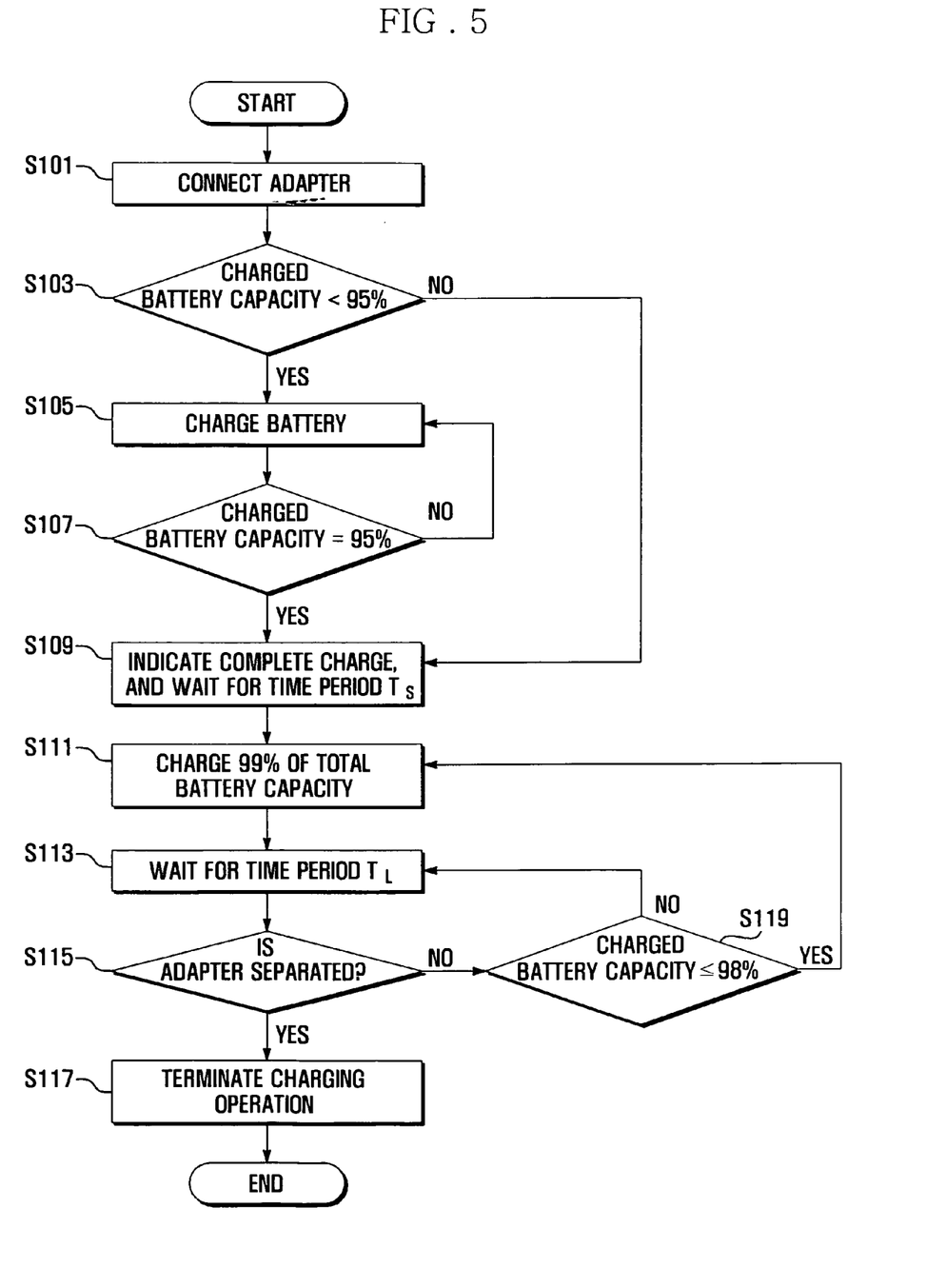
FIG. 5 illustrates a flow chart for controlling charging of a battery in a portable terminal, according to an embodiment of the present invention.

FIG. 5 illustrates a flow chart for a method for controlling charge of a battery in a portable terminal, according to an embodiment of the present invention.

Referring to FIG. 5, the portable terminal is switched on, e.g., booted up, and outputs a preset standby screen. A power charger adapter is connected to the connecting unit of the portable terminal (step S101). The controller controls the power supply to charge the battery using electric power supplied from the power charger adapter.

The controller checks the charged battery capacity using the power supply. If the power charger adapter is connected to the connecting unit of the portable terminal, the power supply checks charging current supplied to the battery. The controller determines whether the charged battery capacity is completely charged (step S103), with reference to the amount of charging current checked by the power supply. That is, the controller identifies whether the charged battery capacity is less then a preset value, for example, 95% of the total battery capacity. If the controller ascertains that the charged battery capacity is less than 95% of the total battery capacity in step S103, it charges the battery (in step S105).

After that, the controller determines whether the charged battery capacity is equal to or greater than 95% of the total battery capacity, using the power supply, (step S107). If the controller ascertains that the charged battery capacity is less than 95% of the total battery capacity in step S107, it charges the battery at 105.

If the controller ascertains that the charged battery capacity is equal to 95% of the total battery capacity in step S107, it indicates a completely charged state of the battery, and stops charging the battery for a time period $T_S$, i.e., a preparation time period, to prepare for a fully charged state (step S109). Meanwhile, the controller also performs step 109 if the charged battery capacity is equal to or greater than 95% of the total battery capacity in step S103.

The controller can adjust a termination current, waiting for the time period $T_S$. The termination current refers to current required for the charged battery to become fully charged. The controller charges the battery of the portable terminal based on the adjusted termination current.

The controller continues charging the battery until it reaches 99% of the total battery capacity (step S111). When the battery has been charged to 99% of the total battery capacity in step S111, the controller waits for a time period $T_L$ (step S113). To this end, the controller checks the charging current supplied from the power charger adapter connected to the connecting unit to determine whether the charged battery capacity is in a fully charged state. For example, if the charging current is changed to 30 mA, the controller ascertains that the present charged battery capacity is 99% of the total battery capacity.

Next, the controller stops charging the battery, waiting for the time period $T_L$ in step S113, and allows the battery to undergo a natural discharge. The time period $T_L$ is a period of time that the battery takes to discharge its capacity in a fully charged state by 1%. As described above, this time period $T_L$ is calculated so that 1% of the charged battery capacity is divided by the current consumption of a portable terminal. The controller can determine this calculated value. This calculated value can be substituted by the average value that is acquired from the calculation through 1% of the charged battery capacity of a battery mounted in a plurality of portable terminals, and through the current consumed in the portable terminals when the portable terminals are manufactured.

The controller determines whether the power charger adapter is separated from the portable terminal (step S115). If the controller ascertains that the power charger adapter is not separated from the portable terminal in step S115, it determines whether the battery discharges to the remaining battery capacity of less then 98% of the total battery capacity (step S119). If the controller ascertains that the battery discharges to the remaining battery capacity of less then 98% of the total battery capacity at 119, it returns to and proceeds with 111 to recharge the battery until the charged battery capacity is 99% of the total battery capacity.

Alternatively, if the controller ascertains that the battery discharges to the remaining battery capacity of equal to or greater than 98% of the total battery capacity at S119, it returns to and proceeds with step S113 where it waits for the time period $T_L$ and allows the battery to undergo a natural discharge until the charged battery capacity reaches 98% of its total battery capacity. When the portable terminal operates a corresponding function, for example, a voice call, file reproduction, and consumes the battery energy at S113, the controller enables the battery handler to determine whether the voltage of the battery drops by a value equal to or less than a preset value, for example, equal to or less than 1% from the maximum value. That is, if the portable terminal is operated in a user function at S113, the controller determines whether a voltage drops by a preset value S119. If a voltage drops by a preset value S119, the controller recharges the battery at S111.

Alternatively, if the power charger adapter is separated from the portable terminal at S115, the controller terminates a charging operation (step S117).

As described above, the charging controlling method, according to an embodiment of the present invention, is performed in such away that: a determination is made as to whether the charged battery capacity is in a completely charged state, i.e., the first charge capacity, or in a fully charged state, i.e., the second charge capacity, based on charging current supplied form the power charger adapter; if the battery is completely charged, the termination current is adjusted; and the battery is charged until the charged battery capacity is fully charged. To this end, the controller of the portable terminal stops charging the battery for the first time period after the complete charge and then adjusts the termination current. Thereafter, the controller charges the battery until it is fully charged, by supplying the adjusted termination current to the battery. The controller may perform a control operation to allow the battery to undergo a natural discharge for a second time period after it is fully charged, and then recharge the battery. The controller may also determine whether the voltage of the battery drops by a preset value when the portable terminal operates a user function, and then recharges the battery if a voltage drop has occurred.

As described above, the battery charging control system and method, according to the present invention, can detect a charged capacity of a battery in a portable terminal and retain the maximum charged state of the battery.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling charging of a battery in a portable terminal whose connecting unit is connected to a power charger adapter, the method comprising:
   checking and adjusting, at a power supply, the electric power supplied to the battery via the connecting unit;
   controlling, at a controller, the power supply to charge the battery until a charging current that varies according to a charged battery capacity reaches a termination current at a first charge capacity that is lower than a full charge capacity;
   adjusting, at the controller, the termination current to fully charge the battery; and controlling, at the controller, the power supply to charge the battery until the charging current reaches the adjusted termination current at a charge capacity that is configured to be the full charge capacity.

2. The method of claim 1, further comprising:
recharging, if the battery has been charged to a second charge capacity and then discharged to a capacity equal to or less than a certain ratio of the second charged capacity, the battery to the second charge capacity; or
recharging, if the battery has been charged to the second charge capacity and then undergoes a natural discharge for a certain time period, the battery to the second charge capacity; or
recharging, if the voltage of the battery having been charged to the second charge capacity drops by a certain value in a state where the power charger adapter is connected to the connecting unit, the battery to the second charge capacity.

3. The method of claim 1, wherein charging the battery comprises:
checking whether the charging current supplied to the battery reaches the termination current; and
identifying, if the charging current reaches the termination current, that the battery has been charged to a first charge capacity and stopping the charging of the battery.

4. The method of claim 1, wherein charging the battery comprises:
checking whether the charging current supplied to the battery decreases and reaches the adjusted termination current; and
identifying, if the charging current reaches the adjusted termination current, that the battery has been charged to a second charge capacity and stopping the charging of the battery.

5. The method of claim 2, wherein recharging the battery to the second charge capacity comprises:
recharging the battery using the power charger adapter; and
interrupting the battery recharge if the charging current of the battery decreases and reaches a preset second termination current.

6. The method of claim 1, wherein:
charging the battery to a first charge capacity is charging the battery until the charging current is decreased from 400 mA to 100 mA; and
charging the battery to a second charge capacity is charging the battery until the charging current is decreased to 30 mA.

7. The method of claim 1, further comprising:
alarming a battery in a completely charged state if the battery is charged to a capacity equal to or greater than a first charge capacity.

8. A system for controlling charging of a battery in a portable terminal, comprising:
a connecting unit configured to connect to a power charger adapter;
a battery configured to be charged by electric power supplied via the connecting unit;
a power supply configured to adjust the electric power supplied to the battery; and
a controller configured to:
control the power supply to charge the battery until a charging current that varies according to a charged battery capacity reaches a termination current at a first charge capacity that is lower than a full charge capacity,
adjust the termination current to fully charge the battery, and
charge the battery until the charging current reaches the adjusted termination current at a charge capacity that is configured to be the full charge capacity.

9. The system of claim 8, wherein the controller further comprises at least one of the following:
an auxiliary timer configured to count a first time period for adjusting the termination current and a second time period that a second charge capacity of the battery takes to be discharged to a capacity equal to or less than a certain ratio of the second charge capacity as the battery undergoes a natural discharge; and
a battery handler configured to check whether a voltage corresponding to the second charge capacity drops by a certain voltage as the portable terminal operates a user function.

10. The system of claim 9, wherein the controller further comprises:
a complete charge processor configured to activate an alarm for a completely charged state if the battery is charged to a first charge capacity.

11. The system of claim 9, wherein the controller is configured to operate the auxiliary timer if the battery is charged to the second charge capacity, and recharge the battery to the second charge capacity if the auxiliary time has completed its counting operation.

12. The system of claim 8, wherein the controller is configured to detect the charged battery capacity using the variation of charging current supplied to the battery.

13. The system of claim 8, wherein the controller is configured to:
charge the battery to a second charge capacity, stop charging the battery, and then recharge the battery to the second charge capacity if the second charge capacity is discharged by a rate equal to or less than a certain ratio of the second charged capacity; or
charge the battery to the second charge capacity, and then recharge the battery to the second charge capacity if the battery voltage corresponding to the second charge capacity drops by a certain voltage; or
charge the battery to the second charge capacity, stop charging the battery for the second time period, and then recharge the battery to the second charge capacity.

14. The system of claim 8, wherein the controller is configured to:
identify that the battery has been charged to a first charge capacity if the charging current reaches the termination current; and
check whether the charging current supplied to the battery decreases and reaches the adjusted termination current, and identify that the battery has been charged to a second charge capacity if the charging current reaches the adjusted termination current.

15. The system of claim 8, further comprising:
a display unit configured to display a first charged state when the battery is charged to a first charge capacity.

16. A portable terminal comprising:
a display unit;
a memory;
a connecting unit configured to connect to a power charger adapter;
a battery configured to be charged by electric power supplied via the connecting unit;
a power supply configured to check and adjust the electric power supplied to the battery; and
a controller configured to:
control the power supply to charge the battery until a charging current that varies according to a charged battery capacity reaches a termination current at a first charge capacity, which is lower than a full charge capacity, adjust the termination current to fully charge the battery, and charge the battery until the charging current reaches the adjusted termination current at a charge capacity that is configured to be the full charge capacity.

17. The portable terminal of claim 16, wherein the controller further comprises at least one of the following:

an auxiliary timer configured to count a first time period for adjusting the termination current and a second time period that a second charge capacity of the battery takes to be discharged to a capacity equal to or less than a certain ratio of the second charge capacity as the battery undergoes a natural discharge; and a battery handler configured to check whether a voltage corresponding to the second charge capacity drops by a certain voltage as the portable terminal operates a user function; and a complete charge processor configured to activate an alarm for a completely charged state if the battery is charged to a first charge capacity.

18. The portable terminal of claim 17, wherein the controller is configured to operate the auxiliary timer if the battery is charged to the second charge capacity, and recharge the battery to the second charge capacity if the auxiliary time has completed its counting operation.

19. The portable terminal of claim 16, wherein the controller is configured to detect the charged battery capacity using the variation of charging current supplied to the battery.

20. The portable terminal of claim 16, wherein the controller is configured to:

charge the battery to a second charge capacity, stop charging the battery, and then recharge the battery to the second charge capacity if the second charge capacity is discharged by a rate equal to or less than a certain ratio of the second charged capacity; or charge the battery to the second charge capacity, and then recharge the battery to the second charge capacity if the battery voltage corresponding to the second charge capacity drops by a certain voltage; or charge the battery to the second charge capacity, stop charging the battery for the second time period, and then recharge the battery to the second charge capacity.

21. The portable terminal of claim 16, wherein the controller is configured to:

identify that the battery has been charged to a first charge capacity if the charging current reaches the termination current; and check whether the charging current supplied to the battery decreases and reaches the adjusted termination current, and identify that the battery has been charged to a second charge capacity if the charging current reaches the adjusted termination current.

22. The portable terminal of claim 16, wherein the display unit is configured to display a first charged state when the battery is charged to a first charge capacity.

\* \* \* \* \*